Patented Nov. 16, 1948

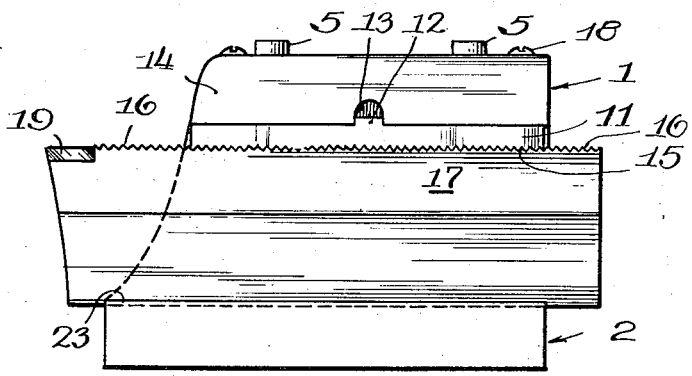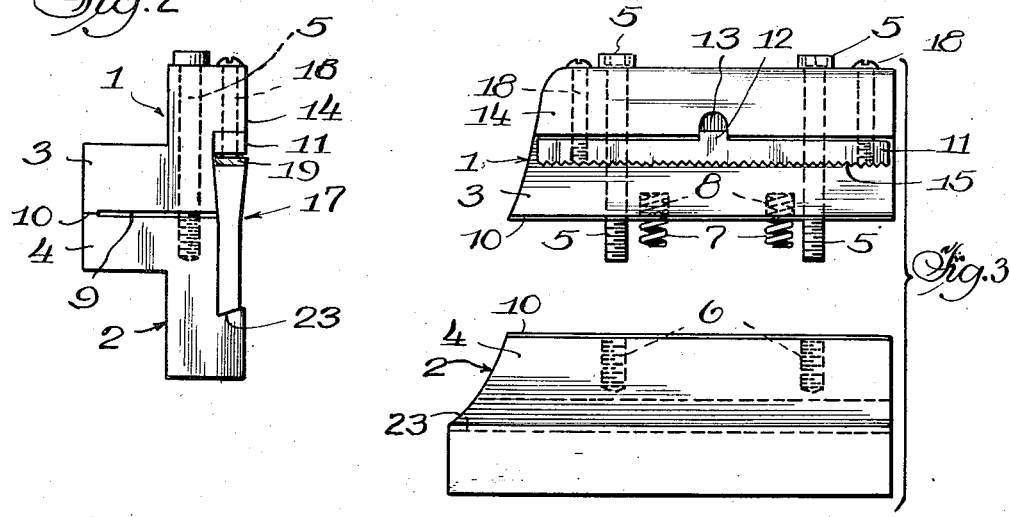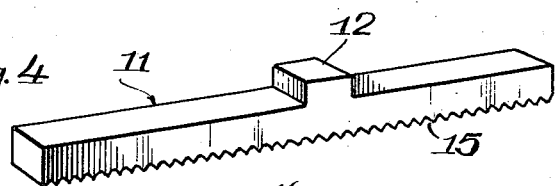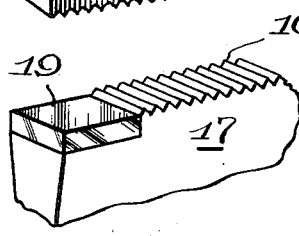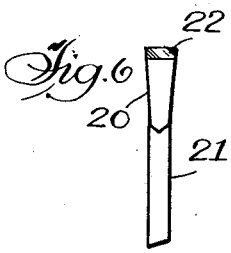

2,453,959

UNITED STATES PATENT OFFICE 2,453,959

TOOLHOLDER ASSEMBLY

David S. Anthony and William B. Blocker, San Antonio, Tex., assignors to Anthony Tool Company, San Antonio, Tex., a partnership Application April 19, 1945, Serial No. 589,114

3 Claims. (Cl. 29—96)

The present invention relates to a tool holder assembly and especially to a novel cut-off tool holder and blade therefor for use in the various types of turret lathe tool posts without the requirement of any auxiliary holding or retaining mechanism.

Among the objects of the present invention is to provide a tool holder with a wide blade overhanging the side of the tool post and dropping or hanging below the bottom level of the slot. In the tool posts now employed on turret lathes, the limiting factor in each is the depth and height of the slots which hold the heretofore used square or substantially square bars of high speed steel which are machined down to form a cut-off blade, or the solid bars of a brazing steel to which a carbide tip is brazed after the bar is machined down to the shape of a cut-off blade.

In the present invention, there is contemplated a novel tool or blade holder in which a pre-formed blade of relatively great width is provided for making deep cut-offs at high speed and with a deep feed. Although the disclosed invention is primarily adapted for use with pre-formed cutting blades having a carbide tip, it is to be understood that the invention is not limited thereto but may be used with solid pre-formed blades of high speed steel.

The invention further comprehends a novel tool holder including a sectional block provided with means for rigidly clamping and retaining a relatively wide cutter blade for the cutting operation and preventing the blade from being forced back into the holder, under all conditions of use and regardless of the strain imposed on the blade.

A further object of the present invention is to provide a novel blade having its upper surface serrated or undulated in a manner to more firmly anchor the blade in position in the tool holder.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of the novel tool holder and cutting blade.

Figure 2 is a view in end elevation of the tool holder assembly.

Figure 3 is a disassembled view of the tool holder.

Figure 4 is a view in perspective of the novel clamping member for retaining the blade against longitudinal movement after it is assembled in the tool holder.

Figure 5 is a fragmentary view in perspective of the upper and outer end of the cut-off blade.

Figure 6 is a view in end elevation of another form of cut-off blade.

Referring more particularly to the novel illustrative embodiment disclosed in the drawings, the tool holder therein shown comprises a pair of sections 1 and 2 formed with offset projections or jaws 3 and 4 adapted to be mounted in a slot provided therefor in the tool post of the lathe. These projections 3 and 4 when mounted in the slot are retained by means of the clamping screws or other retaining means provided on the tool post which press the upper and lower jaws of the blade holder together and thereby firmly secure the holder and blade in position for the cutting operation. The sections 1 and 2 are loosely joined by means of screws or the like 5 loosely inserted into openings provided therefor in the top section 1 and with the ends of these screws or the like adapted to be received in threaded openings 6 in the lower section or base 2 to thereby connect these sections. In addition, these two sections are normally held apart by the use of coil springs 7 mounted within openings at 8 provided therefor in the under surface of the top section 1 and with the lower end of these coil springs adapted to seat against the upper face of the lower section 2.

As shown in Figure 2, the adjoining faces of these sections are cut away at 9 so that only the edges 10 adjacent to the inside wall of the tool post slot engage.

While the pressure of the clamping screws of the tool post on the lathe (not shown) generally forces the two jaws or projections 3 and 4 of the blade holder together sufficiently tight to prevent the cutter blade from being forced back into the holder, the novel invention comprehends the provision of a clamping plate or member 11 having a projection or shoulder 12 on its upper surface adapted to be conformably received within a cut-out or slot 13 formed in the overhanging portion 14 of the top section 1. Preferably this shoulder or projection 12 and its aligned recess or slot 13 are disposed substantially centrally of the holder. The under surface of the clamping member or plate is shown as serrated or undulated at 15 and the top edge 16 of the cut-off blade 17 is similarly shown as serrated or undulated whereby when the clamping member or plate 11 is held in place by the screws 18 and pressed down into contact with the upper edge 16 of the blade 17 by the clamping screws in the tool post pressing firmly down onto the shank comprising the projections 3 and 4, these parts are locked against longitudinal movement by the interengagement of the serrations. The serrations provided on the complementary or abutting surfaces of the clamping member or plate 11 and blade 17 also prevent the blade from being mushroomed on the top due to the pressure of the blade clamping screws or other means such as plungers or the like.

As shown in Figures 2 and 5, the blade is somewhat thicker at its upper cutting edge and this edge is preferably provided with a carbide tip 19 for effective cutting action. However, it is to be understood that if desired, for certain purposes, the blade need not be provided with the carbide tip and in that event, the serrations at the cutting edge will be ground off or eliminated.

As disclosed in the drawings, the top edge of the blade is preferably formed rather thick for brazing onto this edge a relatively thick carbide tip 19 for heavy duty cutting. The blade is also provided with a relatively deep bevel providing thereby sufficient side clearance so that when the side faces of the carbide tip are ground off the grinding wheel is not choked up with steel grindings, but the wheel contacts merely the tip. Where such a carbide tip is provided, we have secured excellent results by tapering and bevelling the sides at an angle of approximately 5° with the vertical, whereas when the blade is preformed from a solid section of high speed steel, the angle may be somewhat reduced.

As further shown in the drawings, this bevel extends only for a fraction of the width of the blade so that the blade is of sufficient thickness at the bottom to withstand the heavy duty imposed thereon. It is, of course, understood that the bevel may be of a different angle than that shown or depending upon the thickness of the blade.

Figure 6 discloses an alternate form of blade in which the blade proper consists of a cutting blade 20 mounted in a V-slot provided in the upper end of a supporting blade 21, the blade being shown with a carbide tip 22 brazed thereto. However, as explained above, for certain purposes the carbide tip may be eliminated and the serrations on the forward cutting edge ground off.

It will be apparent that the novel invention comprehends mounting a wide blade in a recess in the face of the holder with the lower end of the blade seating and pressed against an upwardly inclined shoulder 23 at the base of the slot.

Having thus disclosed our invention, we claim:

1. A cut-off tool holder adapted to be mounted in a slot provided in the tool post of a lathe, comprising a pair of sections each provided with an offset clamping jaw adapted to be received and firmly mounted in the slot, means for aligning and retaining the sections in blade holding relation, a recess provided in the adjoining inner faces of the sections and extending substantially below the slot and clamping jaws, a relatively wide blade mounted in the recess, and an elongated clamping plate carried in the upper section and having interlocking engagement between the plate and blade.

2. A cut-off tool holder adapted to be mounted in a slot provided in the tool post of a lathe, comprising a pair of sections each provided with a clamping jaw adapted to be received and firmly mounted in the slot, means for aligning and retaining the sections in blade holding relation, a recess provided in the adjoining inner faces of the sections and extending substantially below the slot and clamping jaws, a relatively wide blade mounted in the recess with the lower edge of the blade disposed in the base of the recess whereby the blade extends a substantial amount below the slot, and a clamping member positioned above and bearing against the upper edge of the blade and provided with a projection seating within a recess in the upper section.

3. A cut-off tool holder adapted to be mounted in a slot provided in the tool post of a lathe, comprising a pair of sections each provided with a clamping projection adapted to be received and firmly mounted in the slot, means for aligning and retaining the sections in blade holding relation, a recess provided in the adjoining inner faces of the sections for mounting a cut-off blade and with the base of the recess disposed substantially below the lower edge of the clamping projections and slot, a relatively wide blade mounted in the recess with the lower edge of the blade extending below the slot, an elongated clamping plate positioned above and bearing against the upper edge of the blade, and complementary serrations provided on the engaging surfaces of the blade and plate which interengage and prevent longitudinal movement of the blade after it is mounted in operative position.

DAVID S. ANTHONY.
WILLIAM B. BLOCKER.

REFERENCES CITED

The following references are of record in the file of this patent:

UNITED STATES PATENTS

| Number | Name | Date |
| --- | --- | --- |
| Re. 21,877 | Anthony | Aug. 19, 1941 |
| 292,784 | Billings | Feb. 5, 1884 |
| 296,310 | Bowman | Apr. 8, 1884 |
| 1,235,298 | Eisenmann | July 31, 1917 |
| 1,647,989 | Gibbs | Nov. 8, 1927 |
| 1,854,672 | Robinson et al. | Apr. 19, 1932 |
| 2,101,157 | Redinger | Dec. 7, 1937 |
| 2,293,999 | Redinger | Aug. 25, 1942 |

FOREIGN PATENTS

| Number | Country | Date |
| --- | --- | --- |
| 134 | Great Britain | Jan. 12, 1881 |